Figure 1:
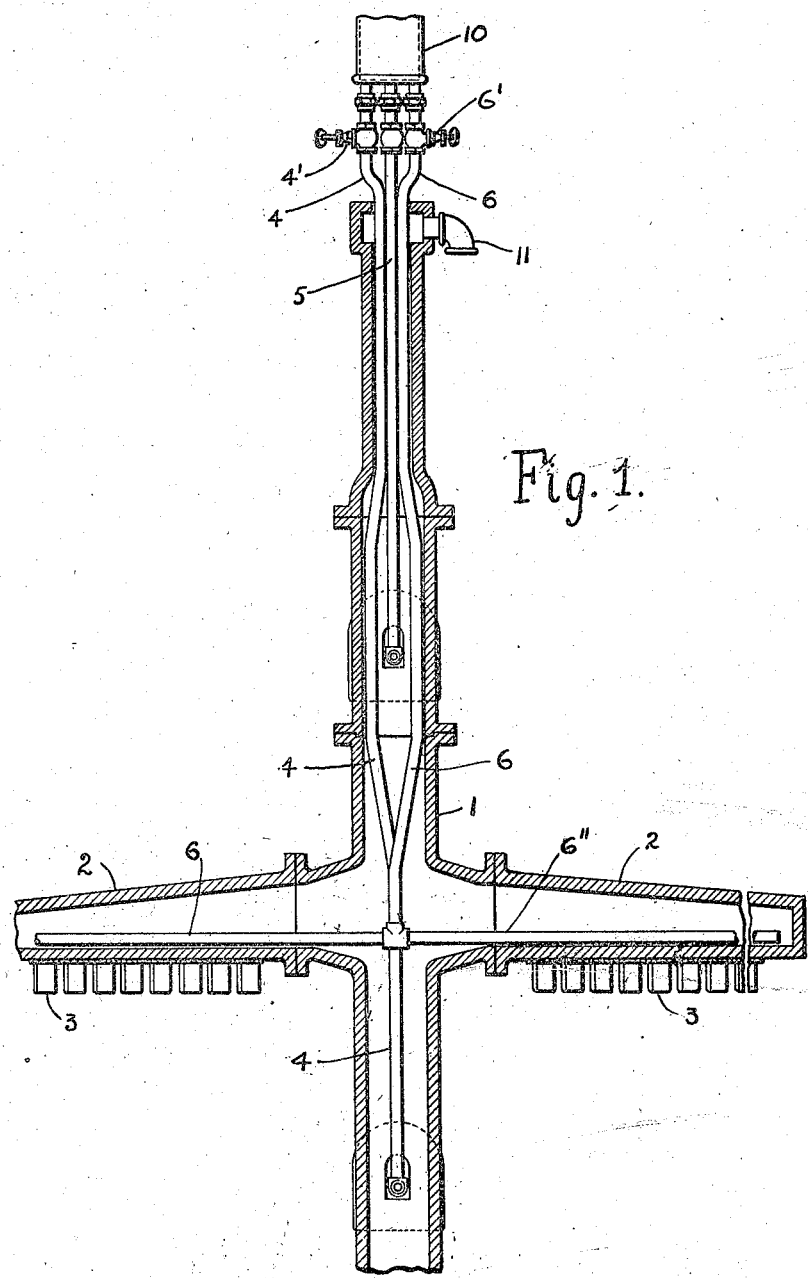

W. A. RANKIN.
ROASTING FURNACE.
APPLICATION FILED DEC. 16, 1905.

899,561.

Patented Sept. 29, 1908.
2 SHEETS—SHEET 1.

WITNESSES:
Frank E. Dennett
John C. Rennie

W. A. Rankin INVENTOR
BY
ATTORNEY.

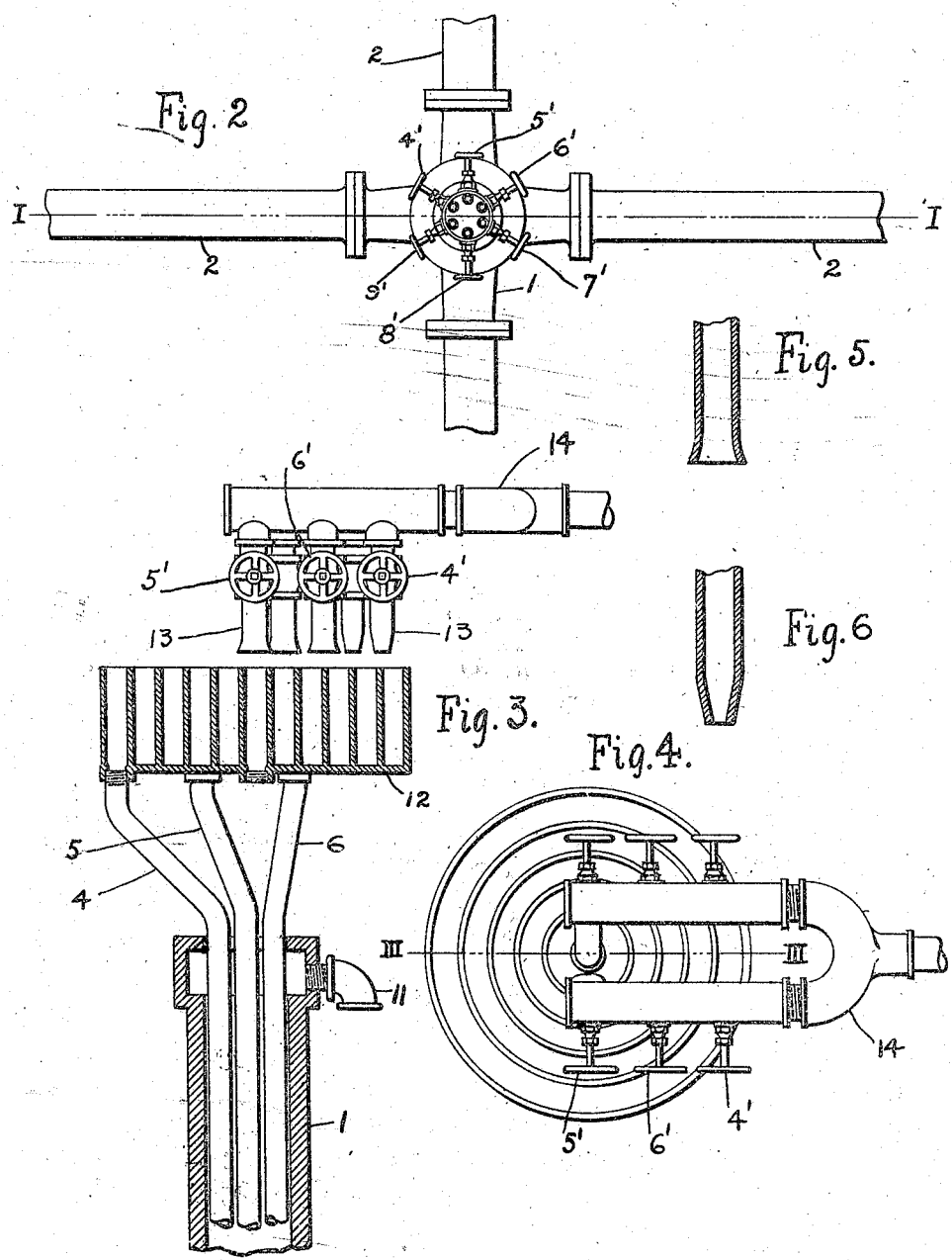

UNITED STATES PATENT OFFICE.

WILLIAM A. RANKIN, OF MILWAUKEE, WISCONSIN, ASSIGNOR TO ALLIS-CHALMERS COMPANY, OF MILWAUKEE, WISCONSIN, A CORPORATION OF NEW JERSEY.

ROASTING-FURNACE.

No. 899,561.  Specification of Letters Patent.  Patented Sept. 29, 1908.

Application filed December 16, 1905. Serial No. 291,993.

*To all whom it may concern:*

Be it known that I, WILLIAM A. RANKIN, a citizen of the United States, residing at Milwaukee, in the county of Milwaukee and State of Wisconsin, have invented certain new and useful Improvements in Roasting-Furnaces, of which the following is a specification.

This invention relates to a fluid circulatory system.

This invention has utility in structures wherein it is desired to control the temperature of parts with a minimum volume of circulating medium.

More particularly, this device is especially desirable when applied to ore roasting furnaces of the superposed hearth type wherein the control is of the admission of water to the rabble arms of the different hearths. A more satisfactory control of the temperature of said rabble arms on the different hearths is permitted and this with a much less quantity of water.

An embodiment of the invention is shown in the drawings wherein,—

Figure 1 is a vertical section on the line I—I of Fig. 2 of a portion of the central stem or rabble shaft having series of rabble arms carrying rabbles or plows. Fig. 2 is a plan view. Fig. 3 shows a controllable fluid supply arrangement which permits the operator to determine readily the volume of fluid delivered to the different hearths. This view is on the line III—III of Fig. 4. Fig. 4 is a plan of the control arrangement shown in Fig. 3. Fig. 5 is a vertical section of a delivery nozzle used in the control shown in Fig. 3. Fig. 6 is a vertical section of the nozzle at right angles to the showing in Fig. 5.

The rotatable member or shaft 1 has connected thereto the radiating arms 2 in a plurality of series. Each series of arms operates in a separate hearth. The arms carry the rabbles or plows 3 to stir the material on the hearth. The stem or member 1 is hollow and has a multiple pipe system therein. The pipes, as shown in the drawing, may be operated as inlet pipes and each pipe in the member 1 serves as a conduit to conduct fluid to the arms of one hearth. As shown, the inlet pipe 4 has the amount of fluid which passes therethrough controlled by the valve 4'. Similarly, the pipe 5 is controlled by the valve 5', and the pipe 6 by the valve 6'. The pipe 6, as shown, extends to the level of the arms in a hearth and at that point has radiating extensions 6'' which extend outward nearly to the ends of the hollow rabble arms. This pipe arrangement or passage system may extend to each hearth, or certain hearths may be omitted, as is found convenient or desirable in operation. Each inlet pipe has its control valve, as shown in Fig. 2, the valves 7', 8' and 9'. These valves control the amount of water which is admitted to the separate hearths from the main pipe 10, which may be an open receptacle of any suitable construction into which water may be discharged, or it may be a part of a pipe or conduit system, the part shown by the drawings, however, being free to rotate with respect to a stationary part of said pipe, any fluid tight joint being provided, if necessary, to prevent leakage of water while permitting rotation to take place, the water passing through the pipes down to the hearth thence out to the end of the arms. As the water emerges from these passages in the ends of the arms, it will, in a roasting furnace, serve to cool the arms. The warm water will return to the central stem or shaft outside of the pipes, rise to the upper end of the shaft or member, and be discharged at opening 11.

In order that the attendant may observe the quantity of water delivered to each hearth, instead of the main pipe 10 having fittings directly to the valves, the pipes from the stem or member see Figs. 3 and 4 are led to a box 12 having chambers therein. In the instance shown there is a separate chamber for each pipe. Nozzles 13 direct fluid into the separate chambers. The corresponding valves 4', 5' and 6' control amount of liquid delivered to the pipes 4, 5 and 6. The valves tap the water delivery main 14. The nozzles 13 have their lower ends suitably formed to properly deliver the water into the separate chambers.

What is claimed and it is desired to secure by Letters Patent is:

1. The combination with a vertically disposed shaft of hollow rabble arms extended therefrom and closed at their extremities remote from the shaft, each of said rabble arms being provided with a conduit adapted to convey a liquid to the extremity of said arm and discharge it into said arm, means for controlling the flow of liquid to some of said arms independently of the flow of liquid to others of said arms, a common outlet from said arms being provided adapted to discharge the liquid at a point elevated above said arms.

2. The combination with a vertically disposed hollow shaft, of hollow rabble arms radiating therefrom and in open communication with the interior thereof, said rabble arms being arranged in series, each arm of a series lying substantially in the same horizontal plane, pipes adapted to convey a fluid to the extremities of and discharge said fluid into said hollow arms, means to control separately the flow of fluid to the arms of each of said series, said shaft providing a common outlet for the fluid from each of said arms and being provided with an overflow disposed vertically above the uppermost series of arms.

3. The combination with a vertically disposed hollow shaft, of hollow rabble arms radiating therefrom and in open communication with the interior thereof, said rabble arms being arranged in series, each arm of a series lying substantially in the same horizontal plane, pipes adapted to convey a fluid to the extremities of and discharge said fluid into said hollow arms, a receptacle concentrically disposed with respect to said shaft and divided into a number of concentrically arranged compartments, a pipe which discharges into one of the series of arms being connected with one of said concentric compartments, means adapted to convey a liquid into each of said concentric compartments and means to control the supply of liquid to each of said concentric compartments, said shaft providing a common outlet for the liquid from each of said arms and being provided with an overflow disposed vertically above the uppermost series of arms.

4. The combination in a furnace, of superposed hearths, a vertical shaft extending through the hearths and provided with a series of arms in each hearth, separate inlet pipes for each series providing for circulation of a fluid to the arms, and means for separately controlling the flow of fluid to each separate inlet pipe.

5. The combination in a furnace, of a shaft having stirring arms, separate pipes at the upper end of the shaft for supplying a fluid to the arms, and manually operated stationary means for controlling the flow of fluid to the separate pipes.

In testimony whereof I affix my signature in presence of two witnesses.

WILLIAM A. RANKIN.

Witnesses:
JOHN DAY, Jr.,
GEO. E. KIRK.